E. BUSSEY.

Cook Stove.

No. 3,815.

Reissued Feb. 1, 1870.

Witnesses.

Chas. A. Wheeler

Austin F. Park

Inventor.

Esek Bussey

N. PETERS, Photo-Lithographer, Washington, D. C.

UNITED STATES PATENT OFFICE.

ESEK BUSSEY AND CHARLES A. McLEOD, OF TROY, NEW YORK, ASSIGNEES OF ESEK BUSSEY.

IMPROVEMENT IN COOKING-STOVES.

Specification forming part of Letters Patent No. 56,686, dated July 24, 1866; reissue No. 3,649, dated September 28, 1869; reissue No. 3,815, dated February 1, 1870.

*To all whom it may concern:*

Be it known that I, ESEK BUSSEY, of the city of Troy, in the county of Rensselaer and State of New York, have invented certain new and useful Improvements in Cooking-Stoves, of which the following is a full and exact description, reference being had to the drawings, in which—

Figure 3:
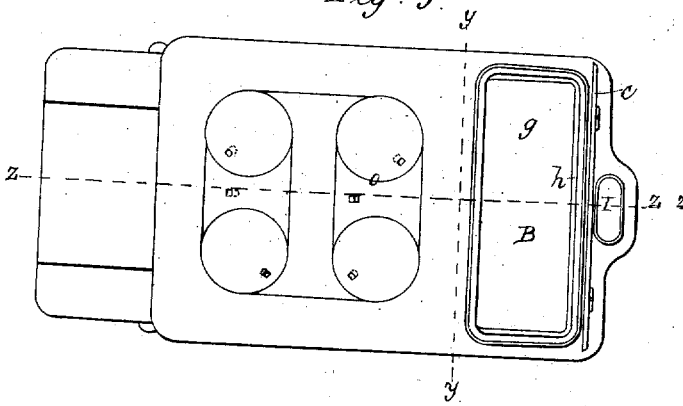
Figure 6:
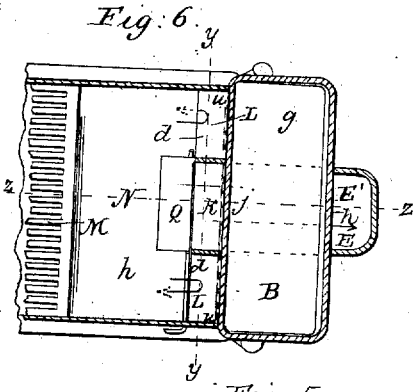
Figure 4:
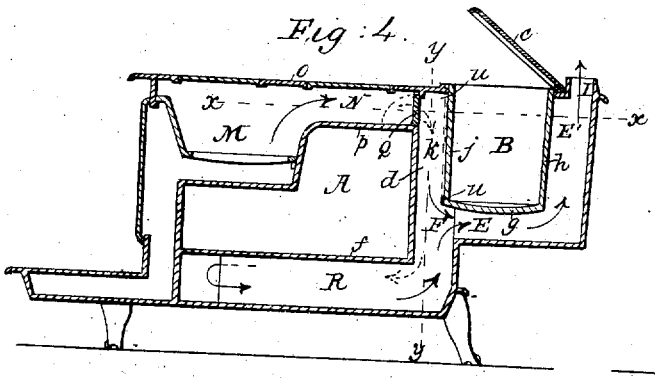
Figure 5:
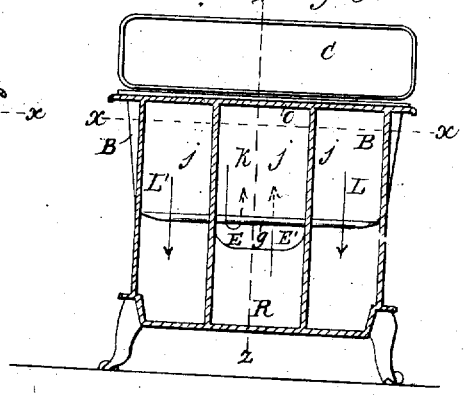
Figure 1:
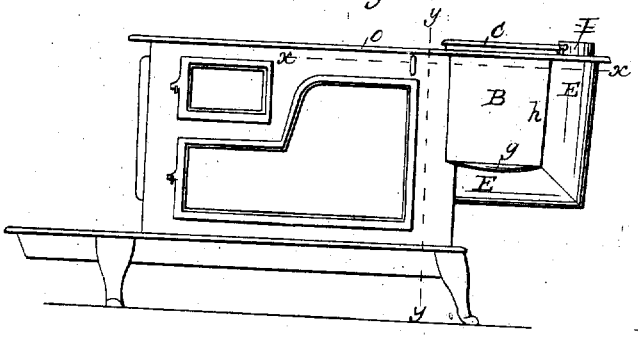
Figure 2:
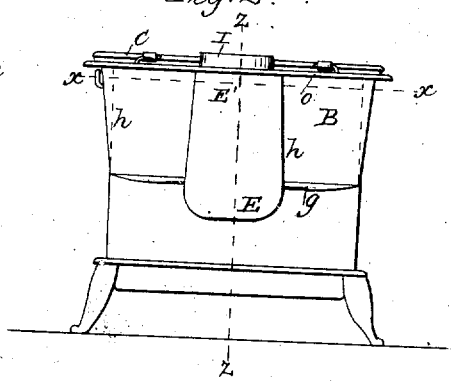

Figure 1 is a side-elevation; Fig. 2, a rear elevation; Fig. 3, a plan; Fig. 4, a vertical section at the line *z z;* Fig. 5, a front view of a section at the line *y y;* and Fig. 6 a top view of a partial section at the line *x x*, all of a cooking-stove embodying my said invention, like parts being marked by the same letters in all the figures, and the arrows therein being indicative of the courses in which the gases of combustion pass through the stove.

One part of my invention consists in arranging a culinary boiler or hot-water reservoir in the rear of the oven of a diving-flue cooking-stove, with an exit-flue extending down the front under the bottom and up the rear of the said reservoir, substantially as hereinafter described and specified.

It also consists in arranging a culinary boiler or hot-water reservoir in the rear of the oven of a diving-flue cooking-stove, with an exit-flue leading from some point in the rear of the vertical flue or flues below the top of the said oven, and continuing under the bottom and up the rear side of said reservoir, substantially as hereinafter described and specified.

It also consists in the arrangement of a diving-flue cooking-stove, with an exit-passage constructed in the vertical rear flue or flues thereof, and below the top of the oven, in such a manner that the gases of combustion, after passing through such exit-passage, will impinge upon or come in contact with the bottom or sides of a reservoir placed in the rear of the stove, and just above said exit-passage, substantially as hereinafter described and specified.

It also consists in the employment of a thin plate or sheet of metal between the front plate of the reservoir and the rear end vertical flues of the said stove, substantially as shown and specified.

In illustration of my invention, the aforesaid drawings represent a cooking-stove having an oven, A, a culinary boiler or hot-water reservoir, B, arranged opposite to the rear upright side or end *d* of the oven, and an exit-flue, E E′, extended from the central vertical flue K of said stove at a point below the top of the oven, under or across the bottom *g* of the reservoir, and from thence up along the rear upright side of said boiler or reservoir to the draft-pipe I.

For the purpose of allowing the boiler to heat more readily, a portion of the rear end vertical plate of said stove is removed, so as to uncover the upper portion of the rear end vertical flues, and the front of the boiler is attached to the rear of said flues, in the manner shown and described in my reissued Patent of July 24, 1866. Between the inner side of the boiler B and the rear end vertical flues K and L L′, a plate may be employed, indicated by dotted line *v v*. The object of this plate is as follows: It has been ascertained by experience that when, during the use of the oven for baking purposes, a large quantity of cold water is suddenly poured into the reservoir, and there is nothing between the front of the boiler and gases of combustion passing through the rear end vertical flues, the heat of the said gases will be so much absorbed by the reservoir as to sensibly cool the oven and interfere with the process of baking. To obviate this I employ the thin plate *w w*, placed between the front of the reservoir and the said rear end vertical flues, and which, while it allows sufficient heat to pass through it to aid in heating the boiler, protects the front thereof from the direct impact of the gases of combustion, and preserves an equable heat in the oven. In case the said plate is dispensed with the inner side J of the said boiler will form a part of the lateral rear casing of the said rear end vertical flues, and will be heated by direct contact with the gases of combustion as they pass down and up the same.

M is the fire-box, and N and R the top and bottom flues of said stove.

The operation of my said invention is as follows: A fire being kindled in the fire-box M, and the damper Q at the top of the oven being open, so as to allow of a direct draft, the gases of combustion from the said fire-box will pass down the middle vertical flue K, through the exit-passage F and exit-flue E E′, to the smoke-pipe I, heating the contents of the reservoir in its passage through the exit-flue, as aforesaid.

By this mode of construction I am enabled to obviate what has been heretofore the greatest objection to reservoir-stoves of this class, namely, that the reservoirs would not heat with a direct draft.

It will also be observed that, by this device of constructing the exit-passage below the top of the oven, I can at the same time by a direct draft heat the rear side of the oven and the reservoir, instead of wasting the heat by carrying it directly to the chimney.

When the damper Q is closed, for the purpose of heating the oven, the gases of combustion will pass down the side vertical flues L L′ and under the bottom of the oven, returning through a central horizontal flue to the central vertical flue K, from which they pass through the exit-flue E E′, as aforesaid.

I am aware that cooking-stoves have been in use in which the reservoir has been incased or inclosed on all sides except the top by a kind of expanded flue, through which the gases of combustion are made to pass.

The advantages of my plan over this device are twofold: First, it is much more economical, requiring far less material and labor to construct it; and, second, by confining the heat and gases of combustion to a small space at the bottom and rear of the reservoir, the contents thereof will be much more effectually heated than where the products of combustion are admitted to an extensive flue-space and permitted to rise and expend their heat at or near the top of the reservoir.

Having described the construction and operation of my said invention, what I claim as new, and desire to secure by Letters Patent, is—

1. A diving-flue cooking-stove with the exit-flue so constructed as to inclose on the sides and bottom the culinary boiler or hot-water reservoir B.

2. A diving-flue cooking-stove with the exit-flue constructed across the bottom and up the rear upright side of the culinary boiler or hot-water reservoir B.

3. A diving-flue cooking-stove constructed with an exit-passage, F, below the top of the oven, and an exit-flue, E E′, in combination with an uncased reservoir, B, attached to the rear of the stove, and placed just above such exit-passage, and so arranged that the gases of combustion, in passing through such exit-flue, will impinge upon or come in direct contact with said reservoir, substantially as and for the purposes hereinbefore specified.

4. An exit-passage, F, constructed in the rear of a diving-flue cooking-stove and below the top of the oven, in combination with an uncased reservoir, B, attached to the rear of the stove, the bottom of which reservoir is also below the top of the oven, and so arranged that the gases of combustion will come in contact with, and heat such reservoir by, a direct draft from the fire-box to the smoke-pipe.

5. In a cooking-stove wherein the rear-end vertical plate, or a portion of the same, has been removed for the purpose of heating a reservoir placed in the rear thereof, the shield-plate *w w*, in combination with the uncased reservoir B and the rear end vertical flues K, L, and L′, substantially as and for the purposes hereinbefore described and specified.

In witness whereof I have hereunto set my hand this 5th day of January, 1870.

ESEK BUSSEY.

Witnesses:
FRANCIS A. WOODS,
CHAS. W. ROBINSON.